2 Sheets—Sheet 1.

D. B. MUCHMORE.
Potato Digger.

No. 201,888. Patented April 2, 1878.

Witnesses.
A. J. De Lacy.
Conrad H. Giegerich

Inventor
David B. Muchmore

2 Sheets—Sheet 2.

D. B. MUCHMORE.
Potato Digger

No. 201,888. Patented April 2, 1878.

Witnesses:
A. J. De Lacy.

Inventor
David B. Muchmore

UNITED STATES PATENT OFFICE.

DAVID B. MUCHMORE, OF MADISON, ASSIGNOR OF ONE-HALF HIS RIGHT TO ANDREW ALBRIGHT, OF NEWARK, NEW JERSEY.

IMPROVEMENT IN POTATO-DIGGERS.

Specification forming part of Letters Patent No. 201,888, dated April 2, 1878; application filed August 8, 1877.

*To all whom it may concern:*

Be it known that I, DAVID B. MUCHMORE, of Madison, Morris county, in the State of New Jersey, have invented certain new and useful Improvements in Machines for Digging Potatoes; and I do hereby declare that the following is a full and exact description thereof, reference being had to the accompanying drawings, forming a part of this specification.

Figure 2:
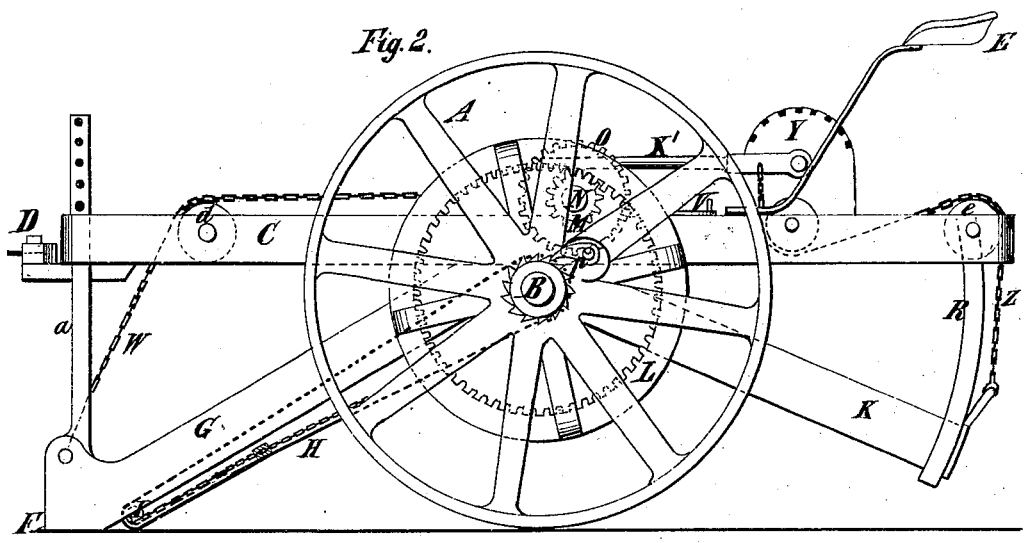
Figure 1:
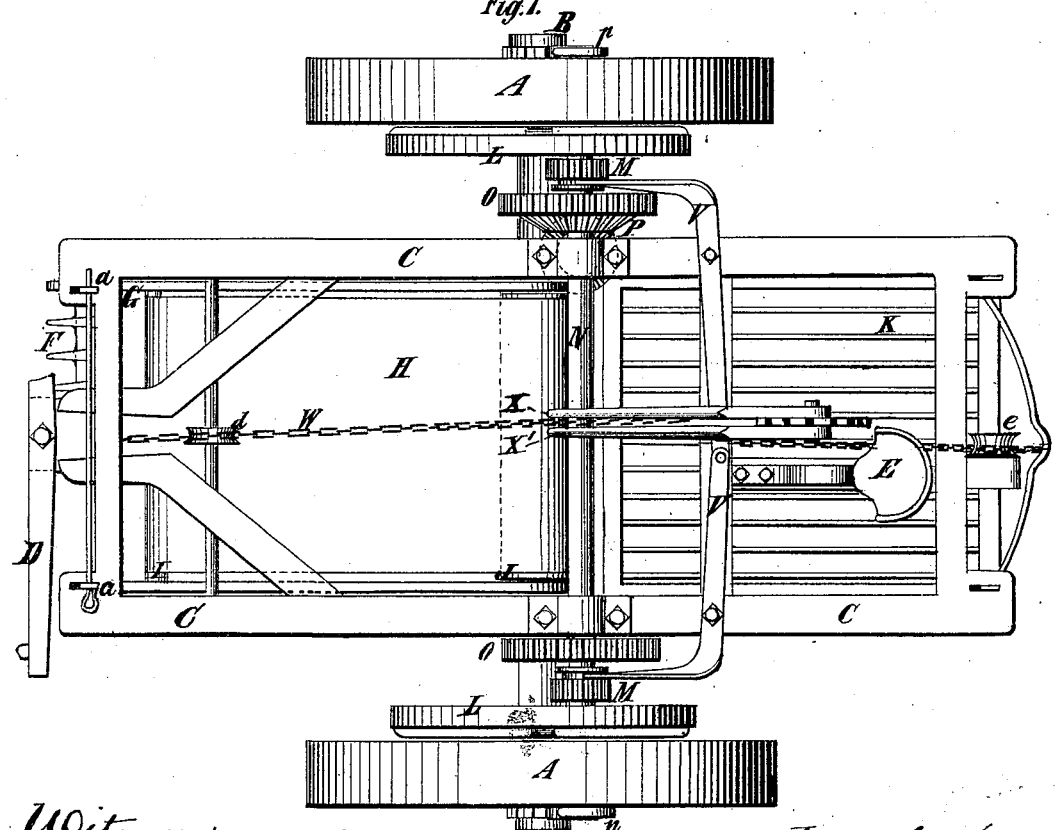
Figure 3:
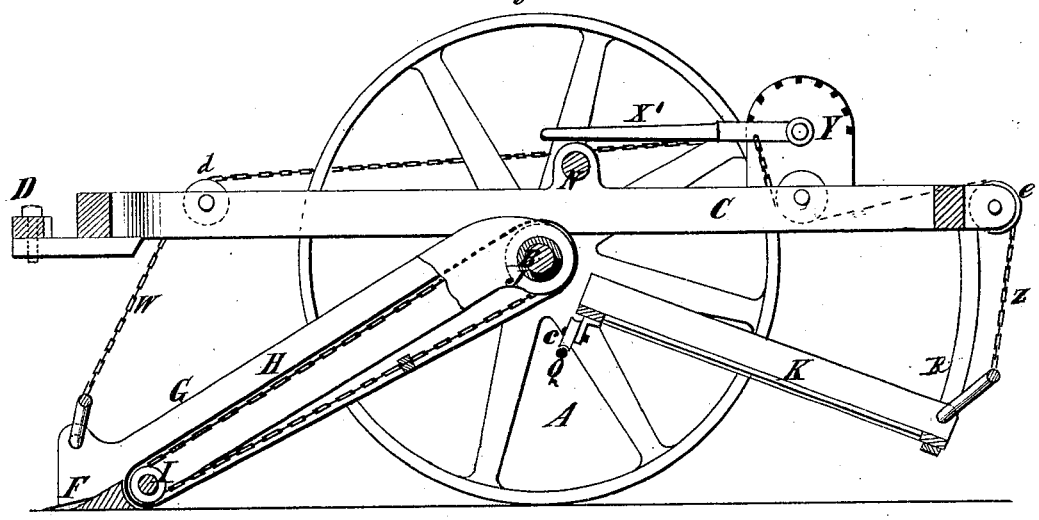
Figure 4:
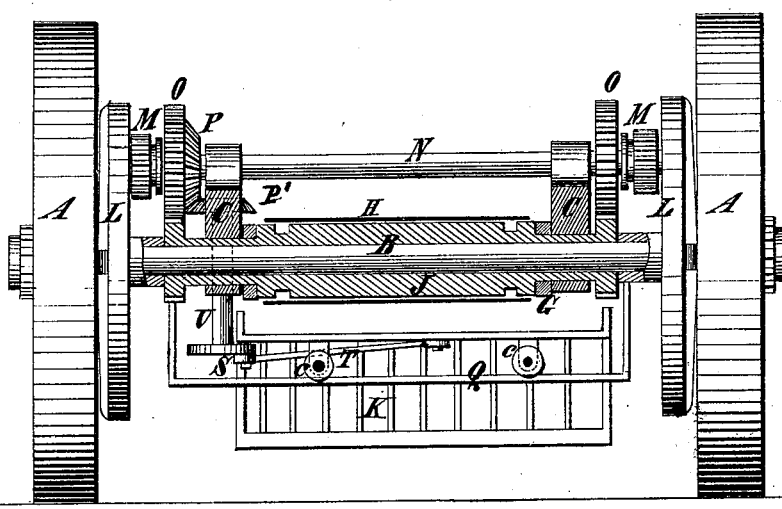

In the drawings, Figure 1 is a plan view. Fig. 2 is a side view. Fig. 3 is a side view, partially in section; and Fig. 4 is an end view, partially in section.

My invention chiefly consists in an inclined digger, provided with an endless apron to dig and carry upward and backward earth, potatoes, and tops, and a reversely-inclined shaker to receive, shake, and properly separate the earth from the potatoes and tops, and discharge the potatoes at the rear of the machine.

It also consists in combinations of parts of minor importance, to be hereinafter explained.

A designates two wheels, mounted loosely on an axle, B, and supporting the frame C of the machine, to which is attached the pole and draft apparatus D, and on which is erected the driver's seat E. These wheels are provided with pawls $p$, engaging with ratchets on the axle in such manner that in moving forward the wheels will impart a rotary motion to the axle, but in moving backward will run free of it.

F designates a series of shovels or diggers, arranged at the forward end of an inclined frame, G, supported at the rear on the axle B, made capable of adjustment to provide for digging at different depths, and furnished with guides $a$ for retaining it laterally in position irrespective of its adjustment. H designates an inclined endless apron or carrier, passing around a roller, I, at the rear of the shovels or diggers, and likewise around a sleeve, J, mounted loosely on the axle B. Motion is imparted to this endless apron or carrier, so that its upper part will travel upward and rearward from the shovels or diggers, and convey the earth, potatoes, and tops to a reversely-inclined shaker, K, whereby the earth is separated from the potatoes and tops, and the latter are discharged at the rear of the machine; if desirable, into any suitable receptacle.

I will now proceed to describe the means illustrated for imparting motion to the endless apron or carrier H.

L designates internally-toothed gear-wheels or trundles, fixed to the axle B, so as to rotate therewith, and gearing with pinions M, mounted on a shaft, N, which, through gear-wheels O, transmit motion to the sleeve J, and move the endless apron or carrier H. The pinions M, through which motion is transmitted to the endless apron or carrier H, are preferably fixed to their shaft by splines or feathers, so that they may be shifted out of gear with the wheels L and released from the axle B, when desirable to move the machine over the ground without operating it. A convenient mechanism for providing for shifting these pinions on their shaft consists of two bent levers, V, fulcrumed on the frame C, engaging with the pinions at one end, and extending within reach of the foot of an occupant of the seat E, and provided with a suitable foot-piece.

K designates a shaker, consisting of a grate or screen inclined reversely to the endless apron H, and capable of receiving a lateral movement as the machine moves forward over the ground. Its forward end is supported on a track, Q, extending transversely across the machine in rear of the axle, and is provided with rollers $c$ to facilitate its lateral movement thereon, while its rear end is pivoted to a hanger, R, whose upright portions fit in guides in the frame C in such manner as to provide for raising or lowering said end of the shaker to give it less or more inclination. The means shown for producing the lateral movements of the shaker consist of a crank, S, connected by a rod, T, with the forward end of the shaker, and mounted on a shaft, U, deriving motion through bevel-gear wheels P P' from the shaft N, wherefore the shifting of the foot-levers V, besides effecting the stoppage of the endless apron or carrier, also serves to stop the motions of the shaker.

Any suitable means may be employed for raising the frame G to adjust its shovels or diggers, or raise them out of contact with the ground, and to adjust the shaker to different inclinations.

A chain, W, attached to the forward part of the frame G, passing over a pulley, $d$, on the frame C, and connected with a hand-lever, X, accessible from the driver's seat, and capable of being locked in a tooth of a catch-piece, Y, may be employed to effect the adjustment of the frame G; and a chain, Z, connected to the rear end of the shaker K, passing over a pulley, $e$, on the frame C, and connected with a hand-lever, X', capable of being locked in a tooth of the catch-piece Y, may be used to adjust the shaker K.

As the machine moves along the shovels or diggers F enter the ground and carry the potatoes and the earth clinging to and surrounding them onto the inclined endless apron or carrier H. Thence all are delivered to the reversely-inclined shaker K, and by the lateral oscillating movements of the latter the earth is separated from the potatoes and falls through it, and the potatoes are discharged at the rear of the machine.

What I claim as my invention, and desire to secure by Letters Patent, is—

1. The combination, in a machine for digging potatoes, of a series of inclined shovels or diggers, arranged at the forward end of an inclined frame, supported at its rear end upon the axle of the machine, and an inclined endless apron or carrier, passing at its lower end over a roller at the lower end of the inclined frame, and at its upper end over a sleeve surrounding the axle of the machine, whereby the shovels and belt may be elevated or depressed together without changing their relative positions, substantially as specified.

2. The combination, in a machine for digging potatoes, of the adjustable frame G, secured to the axle B and carrying the shovels F at its lower end, the endless apron H, passing over the roller I at the lower part of the frame G and over the sleeve J, surrounding the axle B, and the reversely-inclined oscillating shaker K and its actuating mechanism, the whole constructed to operate substantially as specified.

3. In a machine for digging potatoes, the combination, with a shaker, of a track supporting its forward part, rollers on the said part fitting the said track, and a vertically-adjustable hanger, to which the rear part of the shaker is pivoted, substantially as set forth.

DAVID B. MUCHMORE.

Witnesses:
  A. J. DeLacy,
  Leonard F. Giegerich.